US012621636B2

(12) United States Patent
Poulailleau et al.

(10) Patent No.: US 12,621,636 B2
(45) Date of Patent: May 5, 2026

(54) METHOD FOR TRANSFERRING DATA BETWEEN A FIRST WIRELESS SENSOR AND A GATEWAY AND ASSOCIATED NETWORK

(71) Applicant: Aktiebolaget SKF, Gothenburg (SE)

(72) Inventors: Clément Poulailleau, Amboise (FR); Elias Naslund, Oslo (NO)

(73) Assignee: Aktiebolaget SKF, Gothenburg (SE)

( * ) Notice: Subject to any disclaimer, the term of this patent is extended or adjusted under 35 U.S.C. 154(b) by 339 days.

(21) Appl. No.: 18/532,407

(22) Filed: Dec. 7, 2023

(65) Prior Publication Data

US 2024/0205650 A1 Jun. 20, 2024

(30) Foreign Application Priority Data

Dec. 15, 2022 (DE) .......................... 102022213719.1

(51) Int. Cl.
| | |
|---|---|
| *H04W 4/38* | (2018.01) |
| *H04L 5/00* | (2006.01) |
| *H04W 88/16* | (2009.01) |

(52) U.S. Cl.
CPC ............. *H04W 4/38* (2018.02); *H04L 5/0048* (2013.01); *H04W 88/16* (2013.01)

(58) Field of Classification Search
CPC ..... H04W 24/02; H04W 84/20; H04W 28/06; H04W 4/38; H04L 41/06; H04L 43/0829; H04L 67/12; H04L 67/125; H04L 1/0082; H04L 67/10; H04L 2012/2841; H04L 43/12; H04L 69/28; H04L 65/60; H04L 12/2816
See application file for complete search history.

(56) References Cited

U.S. PATENT DOCUMENTS

| | | | | |
|---|---|---|---|---|
| 10,026,314 B1 * | 7/2018 | Philosof | ........... | G08G 1/096791 |
| 11,062,605 B1 * | 7/2021 | McFarland, Jr. | ...... | G07C 5/008 |
| 2008/0071899 A1 * | 3/2008 | Odaka | ..................... | H04L 43/12 709/223 |
| 2019/0320244 A1 * | 10/2019 | Albers | .................. | H04L 43/045 |

FOREIGN PATENT DOCUMENTS

| | | | | | |
|---|---|---|---|---|---|
| JP | 2016161976 A | * | 9/2016 | | |
| WO | WO-2022009652 A1 | * | 1/2022 | ............. | G06N 20/00 |

* cited by examiner

*Primary Examiner* — Olumide Ajibade Akonai
(74) *Attorney, Agent, or Firm* — Stinson LLP

(57) ABSTRACT

A network (1) includes a gateway (2) and a wireless sensor (3). The gateway includes an emission means (4), a reception means (5), and a processing means (6). The wireless sensor (3) includes a reception means (8) and an emission means (7). A method for transferring data between the wireless sensor and a gateway includes the gateway emitting a first query signal (S5) to ask the wireless sensor to send a set of pre-identified data frames (DATA1, DATA2, DATA3), the wireless sensor emitting the set of pre-identified data frames, extracting the frame identifier (ID1, ID3) of each received data frame, and comparing each extracted frame identifier with a set of reference frame identifiers (REF). If a reference frame identifier (ID2) does not match, the gateway emits a second query signal (S6) to ask the wireless sensor for transmitting the data frame (DATA2) associated with the unmatched reference frame identifier.

16 Claims, 3 Drawing Sheets

METHOD FOR TRANSFERRING DATA BETWEEN A FIRST WIRELESS SENSOR AND A GATEWAY AND ASSOCIATED NETWORK

CROSS-REFERENCE TO RELATED APPLICATION

This application claims priority to German Application No. 102022213719.1, filed Dec. 15, 2022, the entirety of which is hereby incorporated by reference.

FIELD

The present disclosure is directed to a network comprising wireless sensors and gateways.

More particularly, the present disclosure deals with transferring data between a first wireless sensor and a gateway.

BACKGROUND

Generally, a network comprises a plurality of wireless sensors communicating wirelessly with a gateway to transmit measurements.

In a star network, each wireless sensor communicates directly with the gateway.

The gateway asks a first wireless sensor to send data determined by the said sensor from measurements taken by the said sensor.

Generally, the data is divided in a set of data frames, each frame comprising a fraction of the data and a frame identifier to identify the said data frame so that then the gateway receives the set of data frames, the gateway reconstitutes the data from the received fractions of data.

Generally, the gateway asks the first sensor to emit a data frame identified by a determined frame identifier and waits for the said data frame.

When the gateway receives the data frame comprising the determined frame identifier, the gateway asks the first sensor to emit another data frame comprising another determined frame identifier.

The gateway asks sequentially for each data frame of the set of data frames. Every time the gateway asks for a data frame, no data frame is transmitted deteriorating the speed data transmission between the gateway and the first wireless sensor.

If the said data frame is lost, the gateway asks the first wireless sensor to reemit the lost data frame and waits until it receives the lost data frame.

Further, as the gateway waits until it receives the data frame comprising the asked frame identifier, if the said data frame is lost, the speed data transmission between the gateway and the first wireless sensor is dramatically reduced.

In a mesh network, the communication between the first sensor and the gateway is generally established through a plurality of wireless sensors so that signals emitted by the gateway and the data frames pass through the plurality of wireless sensors forming a communication channel.

The duration of a signal transmission between two wireless sensors is equal to a latency so that the latency of the communication channel is equal to the number of sensors passed by the signal multiplied by the latency.

As described above, the gateway asks the first sensor to emit a data frame identified by a determined frame identifier and waits for the said data frame and when the gateway receives the data frame comprising the determined frame identifier, the gateway asks the first sensor to emit another data frame comprising another determined frame identifier.

As explained above, the gateway asks sequentially for each data frame of the set of data frames which deteriorates the speed data transmission between the gateway and the first wireless sensor.

The duration of each signal exchange between the gateway and the first sensor is equal to the latency of the communication channel reducing the speed data transmission of the network.

If a data frame is lost, the duration to request the remission of the lost data frame is equal to the channel latency and the duration to get the remitted data frame by the gateway is equal to the channel latency reducing even more the speed data transmission of the network.

Further, the reemission of the lost data frames by the first sensor and the transmission of the said frames through the communication channel consume power.

As each wireless sensor is generally supplied by a battery to facilitate the implementation of the wireless sensor, the duration of the battery is reduced.

In some embodiments of the wireless sensor, the battery of the said sensor may not be replaced, the battery being sealed in the said sensor so that the life time of the wireless sensor is reduced.

Consequently, the present disclosure intends to reduce the number of exchanges between the wireless sensor and the gateway to increase the data transmission speed between the wireless sensor and the gateway and to reduce the energy consumption of the wireless sensor.

SUMMARY

According to an aspect a method for transferring data between at least a first wireless sensor and a gateway.

The method comprises:
a) an emission of a first query signal by the gateway to ask the first wireless sensor to send a set of pre-identified data frames, each data frame comprising a frame identifier and a data package, each data package comprising a different fraction of data so that the data packages of all of the data frames reconstitute the data,
b) after the reception of the first query signal by the first wireless sensor, a successive emission by the first wireless sensor of the set of pre-identified data frames,
c) after the reception of data frames by the gateway, an extraction of the frame identifier of each received data frame, and a comparison of each extracted frame identifier with a set of reference frame identifiers comprising the frame identifiers of the set of pre-identified data frames, and
d) if a reference frame identifier does not match with an extracted frame identifier, the method further comprises an emission of a second query signal by the gateway to ask the first wireless sensor for transmitting the data frame associated with the unmatched reference frame identifier.

The successive emission of the data frames by the first wireless sensor without waiting for a query signal emitted by the gateway between two emissions of a data frame permits to increase the data speed transmission and reducing the signal exchanges between the gateway and the first sensor reducing the power consumption of the first sensor, for example to enhance the duration of a battery supplying the first sensor.

Preferably, the method further comprises:

a reception of each query signal by a second wireless sensor and an emission of the said query signal to the first wireless sensor by the second wireless sensor, and a reception of the set of pre-identified data frames by the second wireless sensor and an emission of the said data frames to the gateway by the second wireless sensor.

Advantageously, the method comprises an emission by the first wireless sensor of the missing frame after reception of the second query signal, and a repetition of steps c) and d) with only the missing data frame.

Preferably, the method comprises before the emission of the first query signal:

an emission of a second query signal by the gateway to ask the first wireless sensor for transmitting the data, after reception of the second query signal by the first wireless sensor, a partitioning of the data in the set of data frames by the first wireless sensor, an emission of an acknowledgment signal by the first wireless sensor, the acknowledgment signal comprising the number of frames, after reception of the acknowledgment signal by the gateway, an emission of a third query signal by the gateway to ask the first sensor for transmitting the frame identifier of each frame of the set of data frames, after reception of the third query signal by the first wireless sensor, an emission of a first signal by the first wireless sensor comprising the frame identifier of each frame of the set of data frames, and a reception of the first signal by the gateway and an extraction of the frame identifier of each frame of the set of data frames from the received first signal, the extracted frame identifiers being the reference frame identifiers.

Advantageously, the third query signal further asks the first wireless sensor for transmitting a header, and wherein the first signal comprises the header, the header comprising the number of frames, a time stamp sequence, and a control code.

Preferably, the data comprises a predetermined number of values of at least one parameter, the first query signal comprises the parameter and the predetermined number of values.

Advantageously, the partitioning of the data comprises:

a determination by the first wireless sensor of the predetermined number of values of the parameter from measurements taken by the first wireless sensor, a cutting of the parameter values in data packages having a same size, and an incorporation of each data package in a different data frame of the set of data frames, each data frame of the set of data frames further comprising a frame identifier.

According to another aspect, a network is proposed.

The network comprises:

a gateway, at least one first wireless sensor, the gateway comprising:

emission means configured to emit a first query signal to ask the first wireless sensor to send pre-identified data frames of a set of data frames, reception means configured to receive successive pre-identified data frames of the set of pre-identified data frames emitted by the first wireless sensor, processing means configured to extract a frame identifier of each received data frame, to compare each extracted frame identifier with a set of reference frame identifiers comprising the frame identifier of each data frame of the set of data frames, and to identify if a reference frame identifier does not match with an extracted frame identifier, the emission means being further configured to emit a second query signal to ask the first wireless sensor for transmitting the data frame associated with the unmatched reference frame identifier.

the first wireless sensor comprising:

reception means configured to receive the first query signal and the second query signal, and emission means configured to successively emit the set of pre-identified data frames, each data frame comprising a frame identifier and a data package, each data package comprising a different fraction of data so that the data packages of all of the data frames reconstitute the data.

Advantageously, the network further comprises at least a second wireless sensor, the network being a mesh network, the second wireless sensor comprising:

receiving means configured to receive the first query signal and the second query signal from the gateway, and to receive the successively emitted set of pre-identified data frames by the first wireless sensor, and emitting means configured to transmit to the first wireless sensor the received first query signal and the received second query signal, and to transmit to the gateway the successively emitted set of pre-identified data frames received from first the wireless sensor.

Preferably, each wireless sensor comprises a battery.

BRIEF DESCRIPTION OF THE DRAWINGS

Other advantages and features of the present disclosure will appear on examination of the detailed description of embodiments, in no way restrictive, and the appended drawings in which.

DETAILED DESCRIPTION

Figure 1:
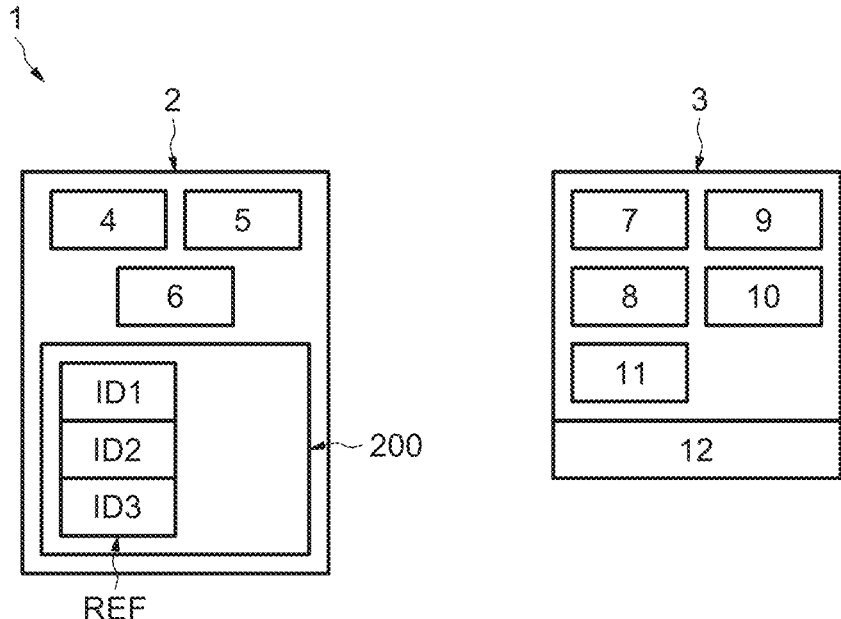
FIG. 1 illustrates schematically a first example of a network according to the present disclosure.

Reference is made to FIG. 1 which represents a first example of a network 1 comprising a gateway 2 and a first sensor 3.

The network 1 is a star network.

In variant, the network 1 comprises more than one sensor.

The gateway 2 comprises emission means 4, reception means 5, and processing means 6.

The processing means 6 comprise for example a processing unit implementing the emission means 4 and the reception means 5.

The first sensor 3 comprises emission means 7, reception means 8, control means 9, and measuring means 10.

The first sensor 3 further comprises a battery 11 supplying the emission means 7, the reception means 8, the control means 9, and the measuring means 10.

The emission means 4 of the gateway 2 communicate with the reception means 8 of the first sensor 3, and the reception means 5 of the gateway 2 communicate with the emission means 7 of the first sensor 3.

The sensor 3 further comprises a battery 11 supplying the emitting means 8, the control means 9, the measuring means 10.

The control means 9 of the first sensor 3 comprise for example a processing unit implementing the emission means 7, the reception means 8, the control means 9, and the measuring means 10.

The measurement means 10 of the first sensor 3 comprise for example a measurement interface measuring the temperature outside the first sensor 3 and/or measuring the vibration of a machine 12 on which the first sensor 3 is fixed.

The first sensor 3 and the gateway 2 communicate wirelessly, for example using a Mesh protocol or a Bluetooth protocol.

Figure 2:
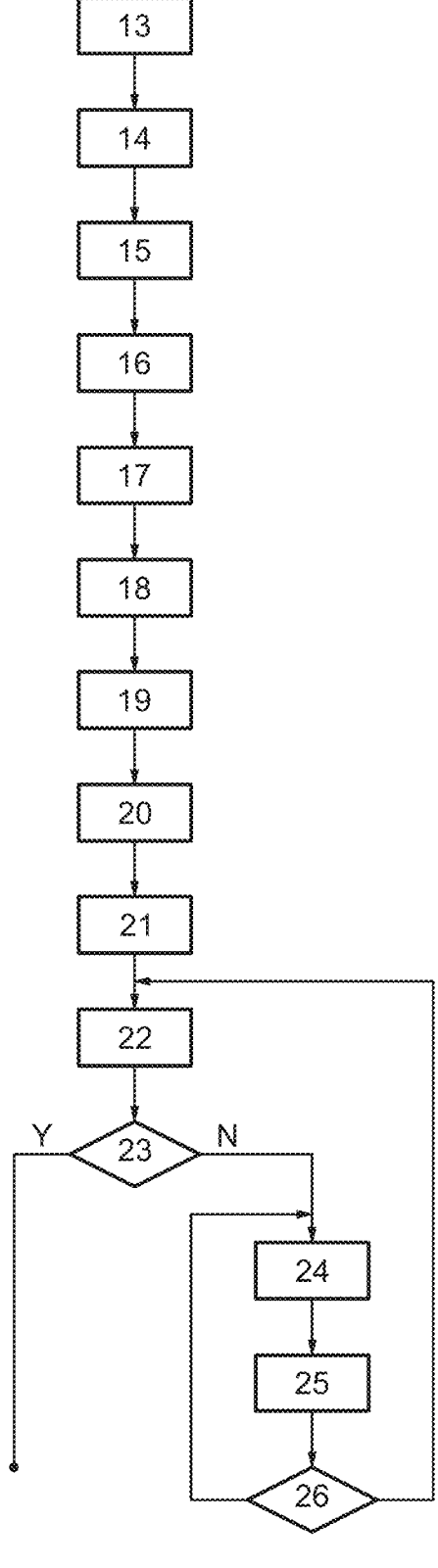
FIGS. 2 and 3 illustrate an example implementing the first example of the network according to the present disclosure.
Figures 3, 4:
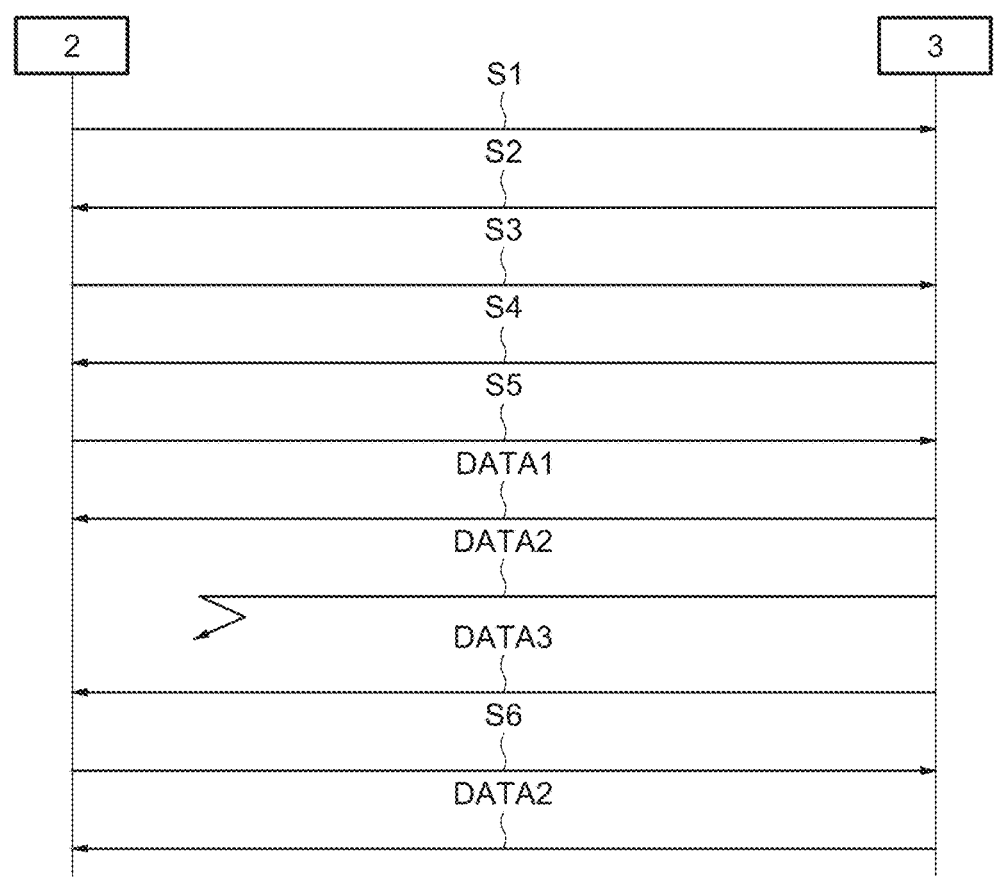
FIG. 4 illustrates schematically a second example of a network according to the present disclosure.

FIGS. 2 and 3 illustrate an example implementing the first example of the network 1 for transferring data between the first sensor 3 and the gateway 2.

It is assumed that the measurement means 10 of the first sensor 3 measure accelerations of the machine 12.

It is assumed that the data comprise acceleration values measured by the first sensor 3.

During configuring steps (steps 13 to 19), the gateway 2 and the first sensor 3 communicate to identify data frames comprising the data to be transferred between the sensor 3 and the gateway 2 during data transferring steps (steps 20 to 26) occurring after the configuring steps.

During a step 13, the emission means 4 of the gateway 2 emit a first query signal S1 (FIG. 3) asking the first sensor 3 to transmit the data.

The first query signal S1 comprises a predetermined number of measured acceleration values.

After reception of the first query signal S1, the control means 9 of the first sensor 3 partitions the data in a set of data frames.

In step 14, the control means 9 determine the predetermined number of acceleration values from measurements taken by the measuring means 10.

In step 15, the control means 9 cut the measured acceleration values in data packages having a same size and incorporate the data packages in different data frames.

Each data package comprises a different fraction of data so that the data packages of all the data frames reconstitute the data comprising the predetermined number of measured acceleration values.

All the data frames reconstituting the data form a set of data frames.

Each data frame comprises a frame identifier and one data package.

It is assumed that the set of data frames comprises three data frames DATA1, DATA2, DATA3, comprising respectively a frame identifier ID1, ID2, ID3.

In step 16, the emission means 7 of the first sensor 3 emit an acknowledgment signal S2 comprising the number of data frames, in this case three.

In step 17, when the reception means 5 of the gateway 2 receive the acknowledgment signal S2, the processing means 6 store the number of data frames in a memory 200 of the gateway 2, and the emission means 4 of the gateway 2 emit a second query signal S3 to ask the first sensor 3 for transmitting the frame identifier of each frame of the set of data frames.

The second query signal S3 may further ask for a header comprising the number of frames of the set of data frames, a time stamp sequence, and a control code.

In step 18, after reception of the second query signal S3 by the reception means 8 of the first sensor 3, the emission means 7 of the first sensor 3 emit a first signal S4 comprising the frame identifier ID1, ID2, ID3 of each frame DATA1, DATA2, DATA3 of the set of data frames DATA1, DATA2, DATA2.

If the second query signal S3 asks for the header, the first signal S4 further comprises the header.

During a step 19, after the reception of the first signal S4 by the reception means 5 of the gateway 2, the processing means 6 extract the frame identifiers ID1, ID2, ID3 from the first signal S4.

The extracted frame identifiers ID1, ID2, ID3 are stored in the memory 200 and form a set of reference frame identifiers REF.

When the set of reference frame identifiers REF is stored in the memory 200 (FIG. 1), the gateway 2 is intended to receive data frames.

During a step 20, the emission means 4 of the gateway 2 emit a third query signal S5 to ask the first sensor 3 to send the set of pre-identified data frames DATA1, DATA2, DATA3.

During a step 21, after reception of the third query signal S5 by the reception means 8 of the first sensor 3, the emission means 7 of the first sensor 3 emit successively the set of data frames DATA1, DATA2, DATA3.

It is assumed that a second data frame DATA2 is lost so that the reception means 5 of the gateway 2 do not receive the second data frame DATA2.

In step 22, after the reception of data frames DATA1 and DATA3 by the reception means 5 of the gateway 2, the processing means 6 extract the frame identifier ID1, ID3 of each received data frame DATA1, DATA3 and compare each extracted frame identifier ID1, ID3 with the set of reference frame identifiers REF.

As the reception means 5 of the gateway 2 has not received the second data frame 2, the reference frame identifier ID2 of the set REF does not match with an extracted identifier frame.

The second frame DATA2 is considered as missing by the processing means 6.

If all the frames DATA1, DATA2, DATA3 of the set of data frames are received by the reception means 5 of the gateway, each reference frame identifiers of the set REF match with an extracted identifier frame (step 23).

The data transmission is considered as being successful.

If a data frame is considered as missing (step 23), in step 24, the emission means 4 of the gateway 2 emit a fourth query signal S6 to ask the first sensor 3 to transmit the second data frame DATA2.

In step 25, after reception of the fourth query signal S6 by the reception means 8 of the first sensor 3, the emission means 7 of the first sensor 3 emit the second data frame DATA2.

If the reception means 5 of the gateway 2 do not receive the second data frame DATA2 within a predetermined duration (step 26), the method continues at step 24.

The emission means 4 of the gateway 2 emit another query signal to ask the first sensor 3 to transmit the second data frame DATA2.

After a predetermined number of attempts of data frame transmission, the method stops.

The predetermined duration depends on the type of network. The predetermined duration is for example equal to 2 minutes.

The number of attempts of data frame transmission is for example equal to three.

If the reception means 5 of the gateway 2 receive the second data frame DATA2 within the predetermined duration (step 26), the method continues at step 22, the processing means 6 extracting the frame identifier of the received second data frame DATA2 and comparing the extracted frame identifier to the set REF.

The successive emission of the data frames by the first sensor 3 without waiting for a query signal emitted by the gateway between two emissions of a data frame permits to increase the data speed transmission and reducing the signal exchanges between the gateway 2 and the first sensor 3 reducing the power consumption of the first sensor 3 to enhance the duration of the battery 11.

If the battery 11 is not interchangeable, for example the battery is sealed in the first sensor 3, as the duration of the battery 11 is enhanced, the life time of the first sensor 3 is extended.

Reference is made to FIG. 4 which represents a second example of a network 1 comprising the gateway 2, the first sensor 3, and a wireless second sensor 30.

The second sensor 30 has the same architecture as the first sensor 3, and comprises emission means 31, reception means 32, control means 33, and measuring means 34.

The second sensor 30 further comprises a battery 35 supplying the emission means 31, the reception means 32, the control means 33, and the measuring means 34.

The measurement means 34 of the second sensor 30 comprise for example a measurement interface measuring the temperature outside the second sensor 30 and/or measuring the accelerations of a machine 36 on which the second sensor 30 is fixed.

The gateway 2 communicates with the first sensor 3 through the second sensor 30 forming a communication channel.

In variant, the gateway 2 communicates with the first sensor 3 through more than one wireless sensor.

The gateway 2, the first sensor 3, and the second sensor 30 form a mesh network.

The implementing of the second example of the network 1 repeats the steps 13 to 26 as defined below except that the first query signal S1, the second query signal S3, the third query signal S5, and the fourth query signal S6 (steps 13, 17, 20, 24) emitted by the emission means 4 of the gateway 2 is received by the reception means 32 of the second sensor 30 and emitted by the emission means 31 of the second sensor 30 so that the first query signal S1, the second query signal S3, the third query signal S5, and the fourth query signal S6 emitted by the emission means 31 of the second sensor 30 are received by the reception means 8 of the first sensor 3, and that the acknowledgment signal S2, the first signal S4, the set of data frames DATA1, DATA2, DATA3 (steps 16, 18, 21) emitted by the emission means 7 of the first sensor 3 are received by the reception means 32 of the second sensor 30 and emitted by the emission means 31 of the second sensor 30 so that the acknowledgment signal S2, the first signal S4, the set of data frames DATA1, DATA2, DATA3 emitted by the emission means 31 of the second sensor 30 are received by the reception means 5 of the gateway 2.

What is claimed is:

1. A method for transferring data between at least a first wireless sensor and a gateway, the method comprising:
   a) an emission of a first query signal by the gateway to ask the first wireless sensor to send a set of pre-identified data frames, each data frame comprising a frame identifier and a data package, each data package comprising a different fraction of data so that the data packages of all of the data frames reconstitute the data,

b) after the reception of the first query signal by the first wireless sensor, a successive emission by the first wireless sensor of the set of pre-identified data frames,
   c) after the reception of data frames by the gateway, an extraction of the frame identifier of each received data frame, and a comparison of each extracted frame identifier with a set of reference frame identifiers comprising the frame identifiers of the set of pre-identified data frames, and
   d) if a reference frame identifier does not match with an extracted frame identifier, the method further comprises an emission of a second query signal by the gateway to ask the first wireless sensor for transmitting the data frame associated with the unmatched reference frame identifier.

2. The method according to claim 1, further comprising:
   a reception of each query signal by a second wireless sensor and an emission of the said query signal to the first wireless sensor by the second wireless sensor, and
   a reception of the set of pre-identified data frames by the second wireless sensor and an emission of the said data frames to the gateway by the second wireless sensor.

3. The method according to claim 1, further comprising an emission by the first wireless sensor of the missing frame after reception of the second query signal, and a repetition of steps c) and d) with only the missing data frame.

4. The method according to claim 1, comprising before the emission of the first query signal:
   an emission of a second query signal by the gateway to ask the first wireless sensor for transmitting the data,
   after reception of the second query signal by the first wireless sensor, a partitioning of the data in the set of data frames by the first wireless sensor,
   an emission of an acknowledgment signal by the first wireless sensor, the acknowledgment signal comprising the number of frames,
   after reception of the acknowledgment signal by the gateway, an emission of a third query signal by the gateway to ask the first wireless sensor for transmitting the frame identifier of each frame of the set of data frames,
   after reception of the third query signal by the first wireless sensor, an emission of a first signal by the first wireless sensor comprising the frame identifier of each frame of the set of data frames, and
   a reception of the first signal by the gateway and an extraction of the frame identifier of each frame of the set of data frames from the received first signal, the extracted frame identifiers being the reference frame identifiers.

5. The method according to claim 4, wherein the third query signal further asks the first wireless sensor for transmitting a header, and wherein the first signal comprises the header, the header comprising the number of frames, a time stamp sequence, and a control code.

6. The method according to claim 1, wherein the data comprises a predetermined number of values of at least one parameter, the first query signal comprises the parameter and the predetermined number of values.

7. The method according to claim 4, wherein the data comprises a predetermined number of values of at least one parameter, the first query signal comprises the parameter and the predetermined number of values, and wherein partitioning of the data comprises:
   a determination by the first wireless sensor of the predetermined number of values of the parameter from measurements taken by the first wireless sensor, a cutting of the parameter values in data packages having a same size, and an incorporation of each data package in a different data frame of the set of data frames, each data frame of the set of data frames further comprising a frame identifier.

8. The method according to claim 2, further comprising an emission by the first wireless sensor of the missing frame after reception of the second query signal, and a repetition of steps c) and d) with only the missing data frame.

9. The method according to claim 8, comprising before the emission of the first query signal:

an emission of a second query signal by the gateway to ask the first wireless sensor for transmitting the data, after reception of the second query signal by the first wireless sensor, a partitioning of the data in the set of data frames by the first wireless sensor, an emission of an acknowledgment signal by the first wireless sensor, the acknowledgment signal comprising the number of frames, after reception of the acknowledgment signal by the gateway, an emission of a third query signal by the gateway to ask the first wireless sensor for transmitting the frame identifier of each frame of the set of data frames, after reception of the third query signal by the first wireless sensor, an emission of a first signal by the first wireless sensor comprising the frame identifier of each frame of the set of data frames, and a reception of the first signal by the gateway and an extraction of the frame identifier of each frame of the set of data frames from the received first signal, the extracted frame identifiers being the reference frame identifiers.

10. The method according to claim 9, wherein the third query signal further asks the first wireless sensor for transmitting a header, and wherein the first signal comprises the header, the header comprising the number of frames, a time stamp sequence, and a control code.

11. The method according to claim 10, wherein the data comprises a predetermined number of values of at least one parameter, the first query signal comprises the parameter and the predetermined number of values.

12. The method according to claim 11, wherein partitioning of the data comprises:

a determination by the first wireless sensor of the predetermined number of values of the parameter from measurements taken by the first wireless sensor, a cutting of the parameter values in data packages having a same size, and an incorporation of each data package in a different data frame of the set of data frames, each data frame of the set of data frames further comprising a frame identifier.

13. A network comprising:

a gateway comprising:

an emission means configured to emit a first query signal to ask the first wireless sensor to send pre-identified data frames of a set of data frames, a reception means configured to receive successive pre-identified data frames of the set of pre-identified data frames emitted by the first wireless sensor, and a processing means configured to extract a frame identifier of each received data frame, to compare each extracted frame identifier with a set of reference frame identifiers comprising the frame identifier of each data frame of the set of data frames, and to identify if a reference frame identifier does not match with an extracted frame identifier, the emission means being further configured to emit a second query signal to ask the first wireless sensor for transmitting the data frame associated with the unmatched reference frame identifier, and at least one first wireless sensor comprising:

a reception means configured to receive the first query signal and the second query signal, and an emission means configured to successively emit the set of pre-identified data frames, each data frame comprising a frame identifier and a data package, each data package comprising a different fraction of data so that the data packages of all of the data frames reconstitute the data.

14. The network according to claim 13, further comprising at least a second wireless sensor, the network being a mesh network, the second wireless sensor comprising:

receiving means configured to receive the first query signal and the second query signal from the gateway, and to receive the successively emitted set of pre-identified data frames by the first wireless sensor, and emitting means configured to transmit to the first wireless sensor the received first query signal and the received second query signal, and to transmit to the gateway the successively emitted set of pre-identified data frames received from first the wireless sensor.

15. The network according to claim 13, wherein each wireless sensor comprises a battery.

16. The network according to claim 14, wherein each wireless sensor comprises a battery.

* * * * *